July 13, 1926.
W. B. KIRKE ET AL
1,592,371
SHEATH CONNECTION IN ELECTRIC CABLE SYSTEMS
Filed June 23, 1923  2 Sheets-Sheet 2
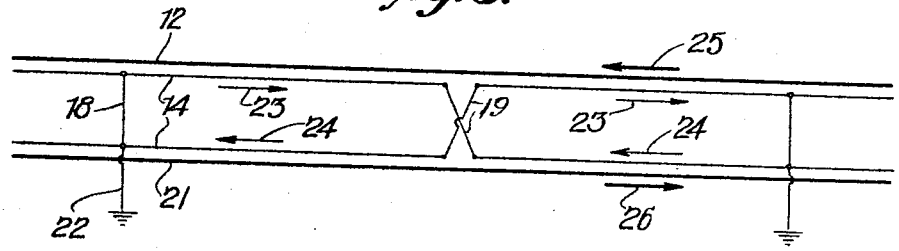
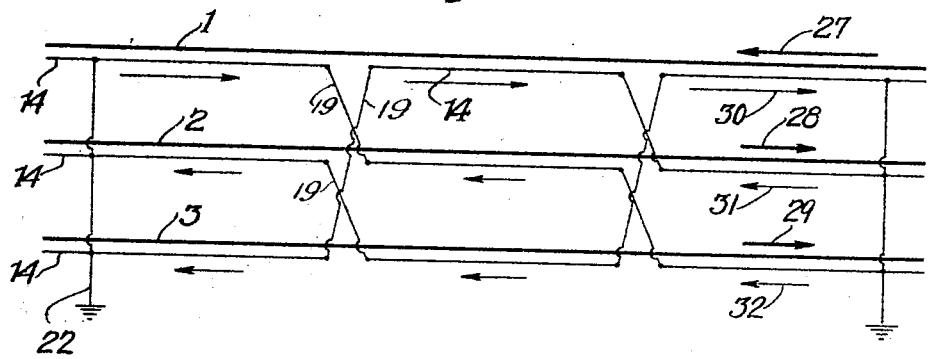
Inventors
WALLACE B. KIRKE
HUDSON R. SEARING
By their Attorney Patented July 13, 1926.

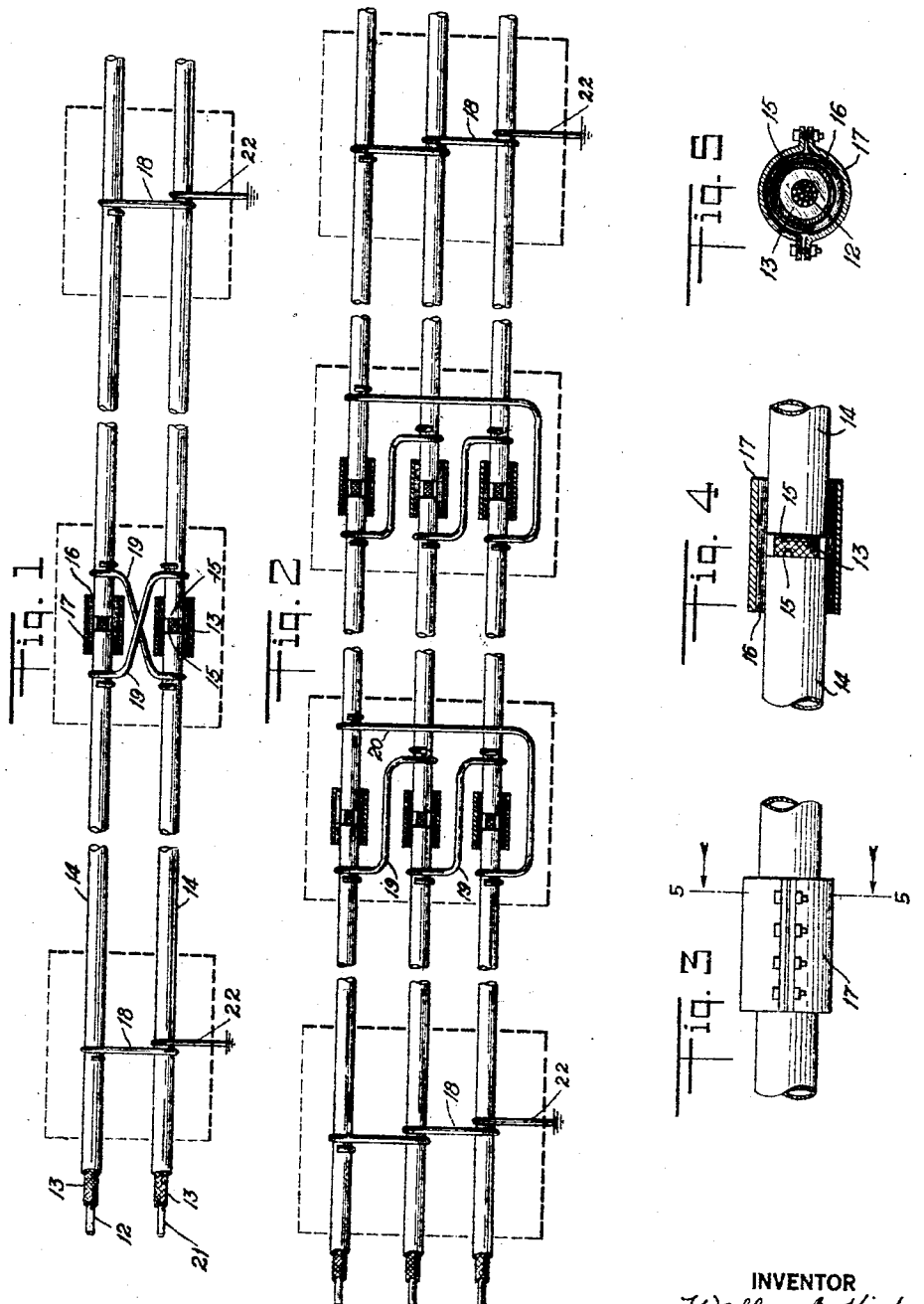

1,592,371

UNITED STATES PATENT OFFICE.

WALLACE B. KIRKE, OF BRONXVILLE, AND HUDSON R. SEARING, OF NEW YORK, N. Y.

SHEATH CONNECTION IN ELECTRIC-CABLE SYSTEMS.

Application filed June 23, 1923. Serial No. 647,246.

Among the principal objects which the present invention has in view are: to reduce induced sheath currents and sheath losses; to avoid the accumulative effect of the induced voltages in said sheaths; to avoid the production of electric arcs in said sheaths; and to simplify and cheapen the construction.

Figure 1 is a schematic view showing a single phase cable system constructed and arranged in accordance with the present invention.

Figure 2 is a similar view showing the invention as applied to a three phase system.

Figure 3 is a detailed view on enlarged scale showing a cover for the sheath gaps.

Figure 4 is a longitudinal sectional view of the same.

Figure 5 is a cross section of the same, the section being taken as on the line 5—5 in Figure 3.

Figures 6 and 7 are diagrams illustrating the currents.

When alternating current is delivered over single conductor cables enclosed in separate sheaths of electro-conductive material, the conductor current sets up E. M. F. in the sheath, said E. M. F. being proportional to the flux interleakage between sheaths, which gives rise to several effects. If a continuous section of the sheath of one conductor is grounded at more than one point or if continuous sections of the sheaths of two or more phases are connected together or grounded at more than one point, a current flow is established which is proportional to the current in the conductors. If the sections of sheaths are insulated from each other and from ground, a potential will be established between the sections or between a section and ground.

Thus in single conductor lead-covered cables installed in ducts constructed of insulating material, a choice must be made between additional losses due to currents in the sheaths if bonded together or grounded at more than one point or protection from potentials generated between the sheaths and ground if they are insulated from each other, or if they are bonded together or grounded at one point only.

A continuous metallic path along the sheath circuit which can be grounded at more than one point is highly desirable to conduct fault currents back to the source of supply and to prevent the sheath from reaching dangerous potentials in case of a breakdown of the insulation between conductor and sheath. This is usually accomplished when using a sectional sheath circuit by providing a separate ground wire to which all sheath sections are connected, thus requiring additional copper and oftentimes an additional duct.

The present invention describes a method of connecting sections of sheaths of single-conductor cables which allows a continuous metallic path along the sheath circuit but reduces the sheath losses to a negligible amount over what is normally met with when a continuous sheath is grounded at more than one point or connected to another metallic conductor at more than one point.

Referring to the drawings and particularly to Figure 1 thereof, it will be seen that the numeral 12 indicates one conductor and numeral 21 the return conductor of a given length of a single phase cable system suitably coated with an insulation 13 which in turn is surrounded by a metallic sheath 14. The sheath is preferably formed of lead as being a metal close in texture and readily bent.

To avoid the accumulation of voltage induced in the sheath 14 by the passage of current through the conductors 12, over a considerable length of the sheath circuit, the sheath is divided into suitable lengths, the terminals 15 of the sections being spaced apart a suitable distance, thus exposing the insulation 13 at these points. To protect the insulation 13 and the conductor 12 therein from weather, insulating coatings 16 are introduced, filling the gap between the termini 15 of the sheath sections and spreading lineally over the ends of the sheath sections to be covered by the clamp caps 17 as seen best in Figures 3 to 5 inclusive. Intermediate the ends of the sheath sections 14 in single phase systems, the said sections of both conductors are united by a bond which consists preferably of a suitable wire bridge 18, the ends of which are wound on the sheaths. These bonds may or may not be grounded.

Extending diagonally across the joints are connectors or jumpers 19 so that the first section of the sheath for the conductor 12 is connected with the second section of the sheath for the conductor 21, and vice-versa: the same arrangement being continued throughout the lengths of the conductors. Fig. 6 illustrates the effect of such connections. In all sections of the sheath for the conductor 12 there is a pressure or voltage induced in the direction of the arrows 23 at the time that the induced voltage in all sections of the sheath for the conductor 21 will be in the opposite direction as shown by the arrows 24. By reason of the cross connections between the sections carrying voltages in opposite directions the induced voltage in the sheath circuit will be neutralized to a greater or less extent, thus reducing the sheath currents and consequent losses and reducing the potential to ground at the ends of the sheath sections. The parts may be so proportioned and connected together and to ground as to practically prevent any flowing of sheath currents. The conductors 12 and 21 are the outgoing and return conductors of a circuit in which at a given instant the current flows in the directions of the arrows 25 and 26.

While the bonds 18 are shown in the drawing as being grounded at adjacent points where the sheath potential has been reduced to zero, as shown by numerals 22, this is not always necessary and only such points are grounded as are required in practice. Systems of two or any even number of phases can be considered as two or more single phase systems by connecting together sheath sections of conductors of opposite polarity.

When using a system having three or an odd number of phases the jumpers 19 are serially installed, that is to say, the sheath section on phase number 1, disposed in advance or at the opposite side of the sheath gaps. The sheath section of phase number 2 is in a similar manner connected with the sheath section of phase number 3 in advance of the sheath gap, while the sheath section of phase number 3, is now connected by a jumper 20 with the section of phase number 1 at the advanced side of the gaps. In this manner the sheath sections of a three phase system are connected and in a similar manner for a system having a greater odd number of phases.

Fig. 7 illustrates this arrangement, the conductors for the three phases being indicated at 1, 2 and 3 and their sheath sections at 14. The currents in the conductors are represented by the arrows 27, 28 and 29. The value of the three-phase currents is taken for representation at the instant when the outgoing current 27 is twice the magnitude of the return currents 28 and 29 as indicated by the comparative lengths of the arrows. At any other instant the three-phase currents will also be balanced, as is well understood. The three-phase currents 27, 28 and 29 induce voltages in the respective sheath sections which are represented at a given instant by the arrows 30, 31 and 32 respectively. The sheath circuit is therefore composed of three sections, one in each phase, or it may be of several lengths, each length having three such sections; and for each such circuit there will be an induced voltage in one section which is equal and opposite in direction to the induced voltage in the other two sections. It is thus possible to proportion the parts so as to fully counterbalance the voltages in the sheath sections. The induced voltages in any three connected sheath sections neutralize each other in the same manner as the mesh voltages of a delta-connected bank of transformers.

On underground transmission lines the sheath sections have to be broken and the cross connections installed at manholes. If manholes are not arranged to give equal lengths of conductor, the result will be unbalanced according to the inequality of the lengths. But the induced sheath voltages will still be partially balanced and the resultant sheath currents (if being understood that the current flowing is the function or result of the voltage induced) will be much less than those established in continuous sheaths bonded together in the usual way.

It will be understood that the jumpers 19 and 20 are preferably installed after the caps 17 and the protective material held thereby have been installed. It will also be understood that while we have shown and described the jumpers 19 as constructed of independent wire elements a similar result can be obtained by employing strips of the sheath 14 formed integral with one of the said sheaths or integral with the sheath gap covers.

By referring to Figures 1 and 2, it will be seen that in case a fault should occur between a conductor and sheath each sheath section has two paths for the return of the short circuit current to ground. Heretofore, if a sheath section had more than one connection to ground, sheath currents and losses would occur. In case one of the ground connections or jumpers from one sheath section to other sheath sections became opencircuited, there still remains a second circuit to ground which will carry away fault currents and prevent the sheath from building up to dangerous potentials.

The fact also that each sheath gap is bridged by metallic connections, all of which unite at one or more common ground points, reduces the potential difference between the ends of adjacent sheath sections and allows the sheath gap to be designed to withstand only small potential differences when a fault occurs in any section from conductor to sheath.

The invention is particularly designed for single-conductor cables with independent sheaths, such as are commonly used for the transmission of power in the form of alternating current of extremely high voltages. When the lead sheaths of such cables are grounded and bonded together in the usual way there is a transformer action between the conductors of the line and their bonded sheaths. The effect is to give rise to electrical losses in the sheath which may amount to as much as forty per cent of the electrical losses in the conductors themselves. These losses are not present where all the conductors are within one sheath, a construction sometimes employed for medium voltage cables. For high voltages separately sheathed cables are required and various expedients have been proposed for avoiding the losses by induced current, but no satisfactory method has been previously found of avoiding such losses without sacrificing protection of the system and requiring additional expense for auxiliary ground wire.

Claims:

1. An electric circuit for transmitting alternating current, the conductors of the circuit being enclosed in metal sheaths and physically separated from each other, the sheaths being in sections insulated from one another and the sections for one conductor being cross connected with those of another conductor so as to provide sheath circuits in which the induced voltages are in opposite directions at different sections.

2. An electric circuit for transmitting three-phase current comprising three conductors enclosed in metallic sheaths and physically separated from one another, the sheaths being in sections insulated from one another, the sections for the respective conductors being cross connected to provide circuits comprising sheath sections of the three several conductors in which circuits the induced voltages are in opposed directions at different sections.

3. An electric cable system for transmission of alternating current comprising insulated conductors enclosed in metal sheaths physically separated from each other, the sheath of each conductor being in sections insulated from each other, and the sections of sheath of one conductor being serially connected in transposed relation with the sections of sheath of another conductor so that the induced voltages in the serially connected sections of sheath tend to oppose each other and to prevent the flow of current.

4. An electric cable system for transmitting three phase currents comprising three insulated conductors respectively enclosed in metallic sheaths physically separated from each other, the sheaths of the several conductors being in sections insulated from each other, and the sections of sheath of the three conductors being serially connected in transposed relation so that the induced voltages in the serially connected sections of sheath act to oppose each other and to prevent the flow of current.

WALLACE B. KIRKE.
HUDSON R. SEARING.